United States Patent [19]

Borcea et al.

[11] Patent Number: 4,593,948

[45] Date of Patent: Jun. 10, 1986

[54] GRIPPER ASSEMBLY

[76] Inventors: Nicky Borcea, 95 Steep Hill, Weston, Conn. 06883; Alexandru D. Ionescu, 190 Sport Hill Rd., Easton, Conn. 06612

[21] Appl. No.: 643,559

[22] Filed: Aug. 23, 1984

[51] Int. Cl.$^4$ .............................. B66L 3/16; F15B 13/42
[52] U.S. Cl. ...................................... 294/88; 294/106; 294/115; 414/753
[58] Field of Search ...................... 294/88, 95, 97, 106, 294/115, 116; 74/90 R, 99 A; 269/34, 218, 233, 234; 414/753; 901/31, 36, 37, 38, 39

[56] References Cited

U.S. PATENT DOCUMENTS

| | | | |
|---|---|---|---|
| 4,244,618 | 1/1981 | Boyer et al. | 294/88 |
| 4,348,044 | 9/1982 | Wood, III | 294/88 |
| 4,509,783 | 4/1985 | Ionescu | 294/88 |

Primary Examiner—James B. Marbert
Attorney, Agent, or Firm—Arthur T. Fattibene

[57] ABSTRACT

A gripper assembly for use on robotic type devices for performing repetitive operations on machine parts that require pick-up and/or transport of such parts. The gripper assembly comprises a housing having a fluid actuated piston and a connected cam operating on a pair of slide bars to effect laterally displacement thereof so that fingers connected to the opposed ends of the slide bars close onto or grip a part to be grasped thereby. A sensor and target therefore is provided to sense the presence of absence of a part between the fingers.

7 Claims, 9 Drawing Figures

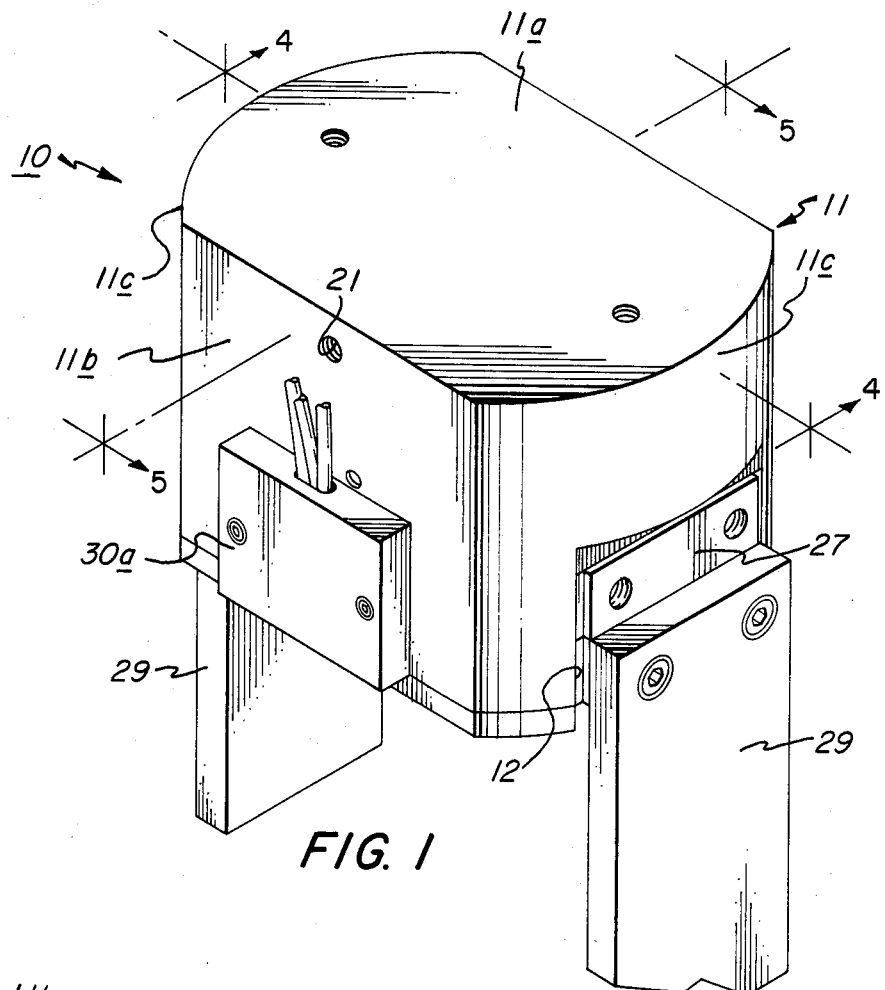
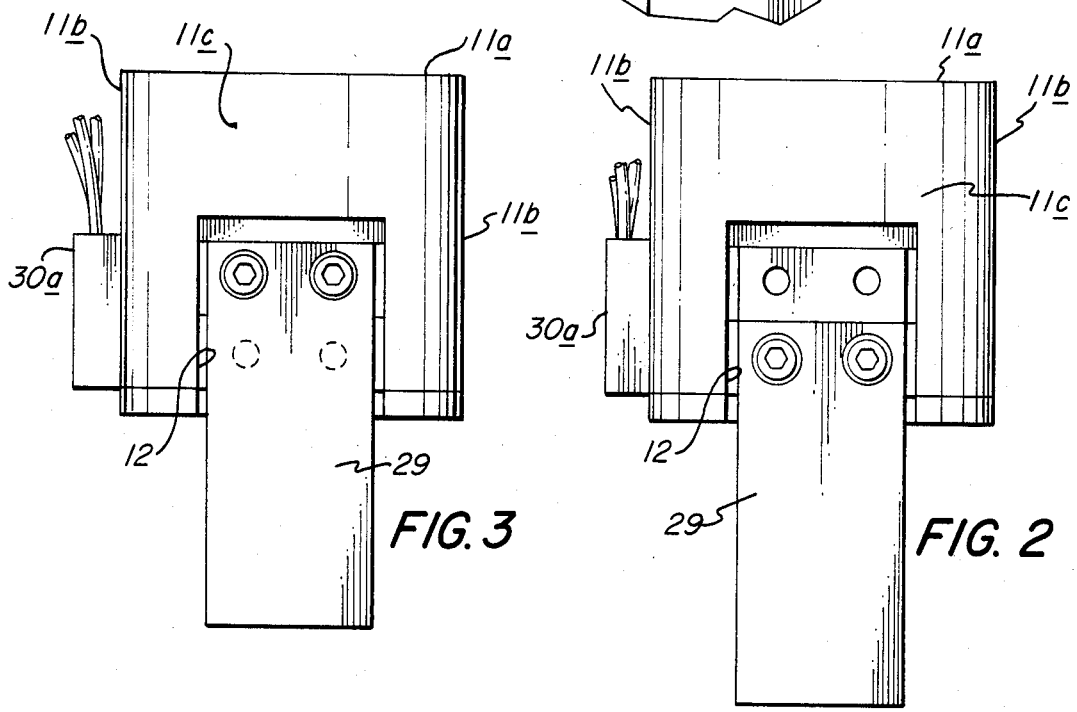
FIG. 1
FIG. 3
FIG. 2

GRIPPER ASSEMBLY

This invention relates to a gripper device for use on robotic machines for gripping and/or transporting machine parts.

Numerous efforts have been made to provide grippers of various types for handling and/or transporting parts. Generally, such grippers can be relatively complicated and costly. Others are limited to use with only certain articles. Still others are unable to distinguish whether or not a part is present between the grasping fingers of such grippers.

OBJECTIVES

An object of this invention is to provide an improved gripper for use in handling and/or transporting machine parts.

Another object is to provide a fluid actuated gripper for effecting latteral displacement of the grasping fingers for supporting a part therebetween.

Another object is to provide a fluid actuated gripper which is capable of grasping a part either externally or internally thereof.

Another object is to provide a gripper with a sensor capable of generating a signal to indicate the presence or absence of a part.

SUMMARY OF THE INVENTION

The foregoing objects and other features and advantages are attained by a gripper comprising a housing having a chamber formed therein in which a piston is movably mounted. A spring normally biases the piston toward its inoperative position. The housing is provided with a fluid inlet for introducing the activating fluid into the piston chamber to effect piston displacement. Connected to the piston is a cam for engaging or camming a pair of complementary slide bars so as to effect lateral displacement thereof. Connected to the outer end of the respective slide bars is a finger arranged to grasp a part therebetween.

To sense the presence or absence of a part between the fingers, an inductive sensor and a complementary target is provided between the housing and the cam that will generate a signal in accordance to the relative movement therebetween, and which signal will indicate the presence or absence of a part between the fingers.

FEATURES

A feature of this invention resides in a positive acting gripper capable of effecting a parallel lateral movement of the gripping fingers thereof.

Another feature resides in the provision of a pair of complementary slide bars for effecting parallel lateral movement of the connected fingers.

Another feature resides in the provision of a fluid activated gripper which is provided with a sensor for detecting the presence or absence of a part between the gripping fingers.

Another feature resides in the provision of a gripper having parallel movement of the gripping fingers and an associated sensor for determining the presence or absence of a part therebetween and which is responsive to the linear lateral displacement of the respective fingers.

IN THE DRAWINGS

FIG. 1 is a perspective view of the gripper enbodying the invention

FIG. 2 is an end view of the gripper of FIG. 1 showing the fingers mounted in one position.

FIG. 3 is an end view of the gripper of FIG. 1 showing the fingers mounted in another position.

DETAIL SPECIFICATION

Figure 4:
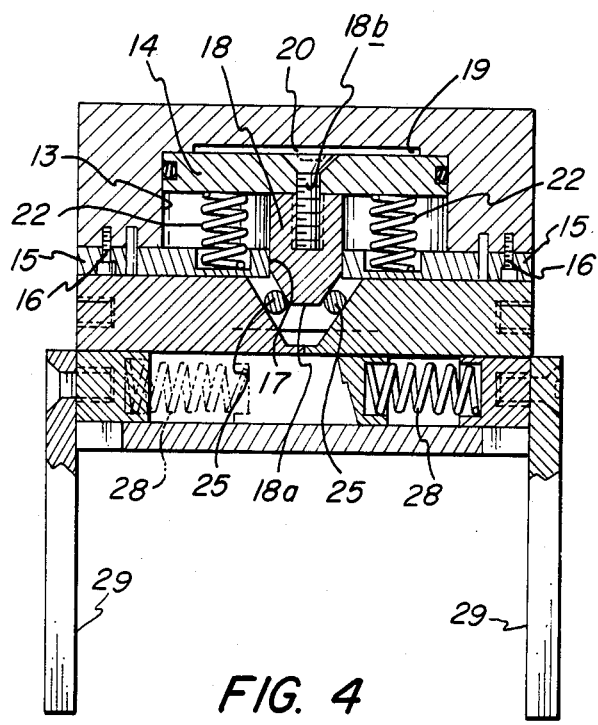
FIG. 4 is a sectional view taken on line 4—4 on FIG. 1.

Referring to the drawings therein shown in FIGS. 1 & 2 a gripper device 10 embodying the present invention. The gripper device 10 comprises a main body 11 to define a housing. As best seen in FIGS. 1 & 2 the main body defines a generally inverted U shaped housing having a top 11A having depending opposed side walls 11B—11B to define a slideway 12 therebetween. As seen in FIGS. 1 & 2 the slideway 12 opens to the opposed end walls 11C—11C.

Formed in the top internally thereof is a piston chamber 13 in which a piston 14 is displaceably mounted. The bottom of the piston chamber 13 is defined by a pair of wear plates 15—15. The wear plates 15—15 are each secured to the body by suitable fasteners such as screws 16. The inner ends of the respective wear plates 15—15 as spaced apart to define an opening 17 for accommodating and guiding a cam 18 which has a depending wedge shaped end portion 18A to equalize lateral displacement of slide bars 27. The cam 18 is secured to the underside of the piston 14 by a fastener or screw 18B. The piston chamber 13 disposed to one side of the piston 14 is provided with a counter bore 19 to define a chamber 20 for introducing a fluid pressure, e.g. compress air onto the piston 14 to effect displacement thereof within chamber 13. The activating fluid is introduced in chamber 20 to exert a fluid pressure on the piston through an inlet 21. A pair of springs 22—22 seated on the wear plates 15—15 exert a spring bias on the piston for normally exerting the piston toward an inoperative position.

Figure 9:
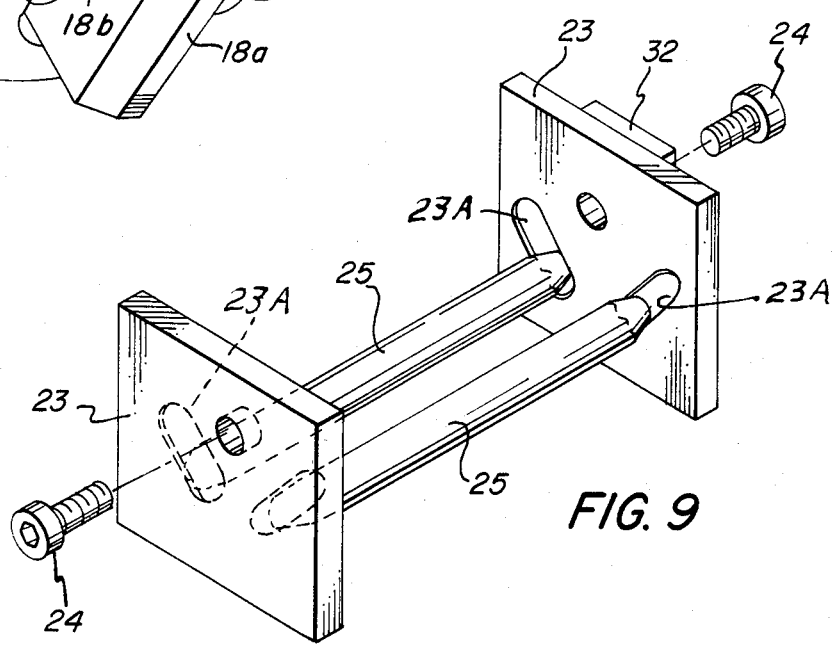
FIG. 9 is a detailed perspective view of the side or guide plate and rollers.

Connected to the opposed ends of the cam 18 is a side or guide plate 23—23. The respective side or guide plates are secured to the cam 18 by suitable fasteners, e.g. screws, 24. As best seen in FIG. 9, each of the opposed side plates 23—23 is provided with aligned inclined slots or recess 23A for supporting therebetween in spaced relationships a pair of guide rollers 25—25.

As it will be noted in FIG. 4, the guide rollers 25—25 are disposed below the cam 18 so as to receive the wedged end portion 18A of the cam therebetween. Thus, when the piston is displaced downwardly, as viewed in FIG. 4, as fluid pressure is introduced into chamber 20, the cam end 18A will effect a lateral displacement of the guide rollers 25—25 which have their respective end portions pivotally disposed in inclined slotted recess 23A formed in the guide plate 23. It will be noted that as the rollers are laterally displaced they will tend to ride up the inclined end slots 23A.

Figure 6:
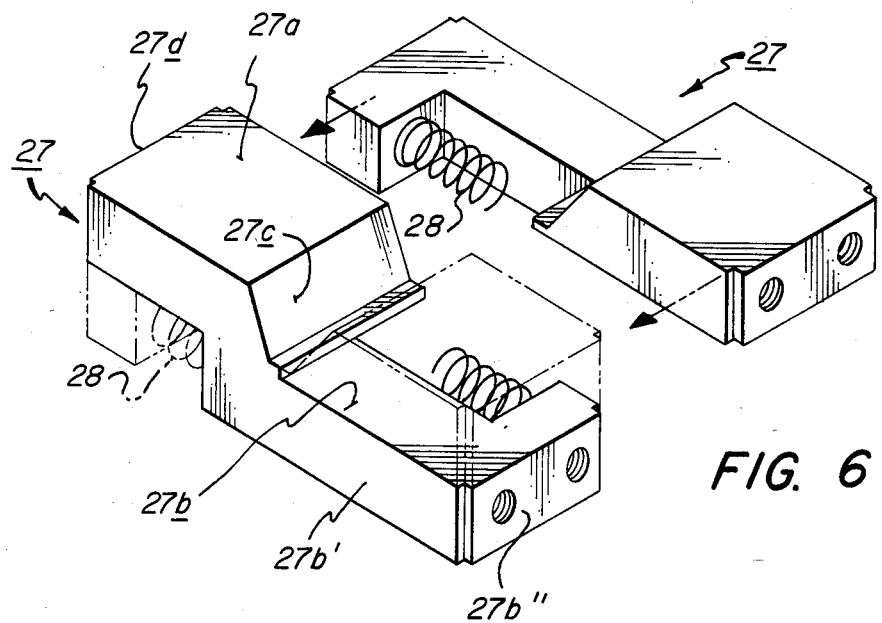
FIG. 6 is a detailed perspective exploded view of the slide bar assembly.
Figure 7:
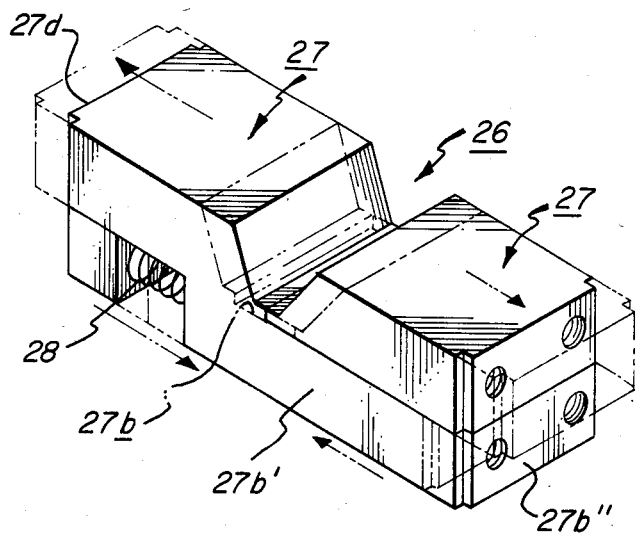
FIG. 7 is a detailed perspective view of the slide assembly in assembled position.

Slidably disposed in the slideway 12 is a slide assembly 26 which comprises a pair of identical or complementary interengaging slide members or bars 27—27. The details of the respective slide member 27—27 are best seen in FIGS. 6 & 7. As best noted in FIGS. 6 & 7 the respective slide members 27—27 includes an upper portion 27a and a connected lower portion 27b. The upper portion defines a block having a width generally equal to the width of the slideway and which block portion is provided in an inclined camming surface 27c. The lower portion 27b is defined by a longitudinally extending leg portion 27b' and a laterally extending lower leg portion 27b".

As best seen in FIG. 7, two slide members 27—27 are oppositely disposed to define a two part slide assembly 26 whereby the top portion 27a and bottom portion 27b of the respective slide members are laterally displaced by the displacement of the piston 14 and cam 18 downwardly as viewed in FIG. 4. It will be noted that the opposed inclined surfaces 27c of the respective slide members 27—27 define a wedge shaped groove against which the guide rollers 25—25 ride as the piston 14 and connected cam 18 is displaced under fluid pressure and against the bias of springs 22—22. Spring means 28—28 are also disposed between the respective slide members 27—27 for maintaining the slide members under spring tension.

In accordance with this invention a pair of complementary gripping fingers 29—29 as suitable secured to either the opposed upper ends 27a or opposed lower ends 27b" of the respective slide members.

The slide assembly 26 which are formed of two complementary slide bars or members 27 as described, are arranged so that when they are laterally displaced, the upper portions 27a of the respective bars or slide members are protracted while the opposed end portion 27b" of the respective slide bars are retracted. Thus, if the respective fingers 29 are connected to the ends 27b" of the respective slide bars 27—27, the fingers are moved inwardly toward one another as the slide bars are laterally displaced under the action of the piston 14 and connected cam 18.

If the fingers 29 are connected to the end surface 27d of the upper portion 27a of the respective slides, its fingers are outwardly displaced relative to each other as the slide bars are laterally displaced under the action of the piston 14 and connected cam 18 (See phantom position of FIG. 7). Therefore, depending upon which surface of the slide bar fingers 29 are connected, the gripper can be adjusted to accommodate a plurality of different size articles which fall within the given range of movement. Also, the arrangement of the fingers and the manner by which they are connected to their respective slide members will allow the grippers to grip an article along the outer diameter thereof, as when the fingers close inwardly, as the slide bars 27—27 are laterally displaced, or to grip a part by its internal diameter as when the fingers 29 are moved laterally outwardly relative to one another when the slide bars are laterally shifted.

Figure 5:
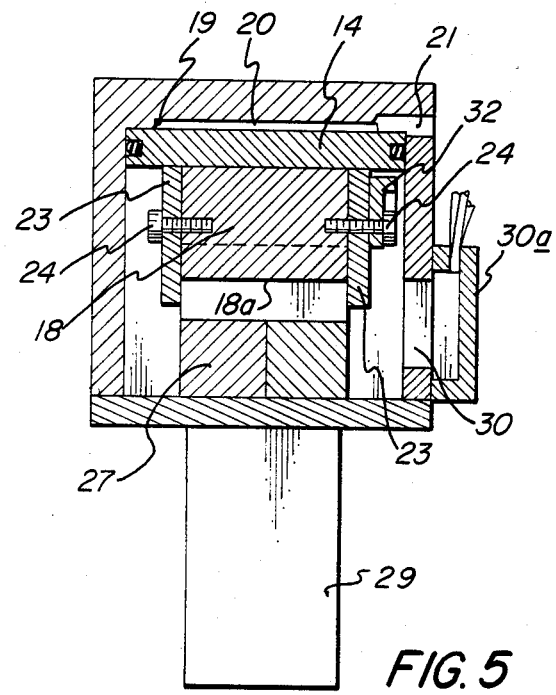
FIG. 5 is a sectional view taken on line 5—5 on FIG. 1.
Figure 8:
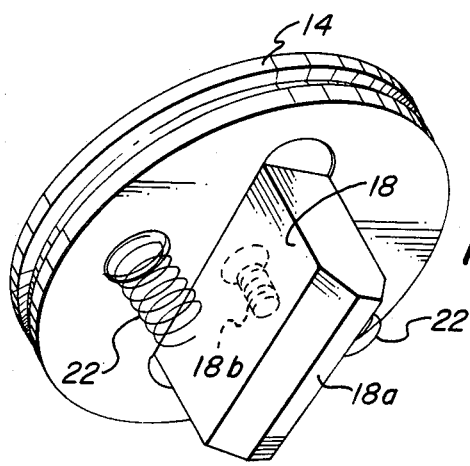
FIG. 8 is a detailed perspective view of the piston.

To determine whether or not a part is disposed between the fingers 29—29, an inductive sensor 30 is connected to one side 11B of the housing. As shown in FIGS. 1 and 5 the sensor is retained in a housing 30A connected to side 11B.

A target 32 is carried on the side or guide plate 23 adjacent the side 11B to which the sensor 30 is connected. The arrangement of the target 32 and sensor 30 is such that the relative movement thereof will generate a signal which will indicate whether a machine part or article has been grasped by the fingers.

It will be understood that the gripper device 10 described is suitably secured to the arm (not shown) of a robotic type device.

With the arrangement described it will be apparent that the displacement of the slide bar 27—27 laterally under the displacement action of the piston 14 and connected cam 18 effects a latteral parallel displacement of the associated fingers to grip or grasp therebetween a part or article. Depending to which portions of the slide bar the fingers are connected, the fingers can be latterally displaced inwardly or outwardly as the respective slide bars 27—27 are latterally displaced. The relative movement between the target 32 and sensor 30 further functions to determine the presence or absence of a part therebetween.

While the invention has been described with respect to a particular embodiment thereof, variations and modifications may be made without departing from the spirit or scope of the invention.

What is claimed is:

1. A gripper device comprising,
   means defining a housing having a piston chamber formed therein,
   a piston reciprocally mounted in said piston chamber, means for normally biasing said piston toward an inoperative position,
   a pair of laterally displaceable slide means mounted in said housing means, said slide means being rectilinearly displaceable,
   a finger means connected to said of said slide means,
   a cam actuator means including a cam connected to said piston,
   and said slide means having opposed cam surfaces, and said cam actuator means including cam rollers disposed between said cam and said opposed cam surfaces, said cam rollers being disposed in a camming relationship with said cam whereby said slide means and connected fingers are laterally displaced to move said finger means in parallelism between an operative and inoperative position.

2. A gripper device as defined in claim 1 and including a sensing means for indicating the presence or non presence of a part between said finger means.

3. A gripper device as defined in claim 2 wherein said sensing means comprises a sensor connected to said housing, and a target connected to said cam actuator means whereby said target is moved relative to said sensor as said piston is actuated.

4. A gripper device as defined in claim 1 wherein each said slide means comprises identical slide bars which are similarly constructed and which compliment one another, and spring means interposed between said slide bars for normally maintaining said slide bars under spring tension.

5. A gripper device as defined in claim 4 wherein each slide bar includes an upper head portion and a lower head portion, said upper head portion having an inclined cam surface, whereby said inclined cam surfaces are oppositely disposed to define a wedge shaped groove therebetween in the assembled position of said slide bars.

6. A gripper as defined in claim 1 wherein said cam actuator means comprises opposed side plates connected to said cam, and said pair of cam rollers being supported between said side plates whereby said cam rollers are disposed between said cam and said cam surfaces.

7. A gripper device comprising,
a housing having a body portion,
a piston chamber formed in said body portion,
a piston movably mounted in said piston chamber,
spring means for normally biasing said piston toward an inoperative position,
means for introducing a fluid pressure into said chamber for effecting the displacement of said piston,
a cam connected to said piston,
opposed side plates connected to said cam,
a pair of cam rollers movably supported between said side plates,
a pair of complementary slide bars disposed within said housing,
said complementary slide bars having opposed inclined cam surfaces defining a wedge shaped groove therebetween,
said wedge shaped groove being disposed opposite said cam,
springs means disposed between said slide bars for normally maintaining said slide bars under spring tension,
a sensor disposed in said housing,
and a target connected to said side plates disposed adjacent to said sensor,
and a finger connected to each of said slide bars whereby the actuation of said piston under fluid pressure effects the lateral displacement of said slide bars and connected finger to grasp therebetween a part, and whereby said sensor and said target generates a signal to determine the presence or non presence of a part between.

* * * * *